Jan. 10, 1961 J. C. KREJCI 2,967,762
FURNACE CARBON BLACK PROCESS AND APPARATUS
Filed April 6, 1956
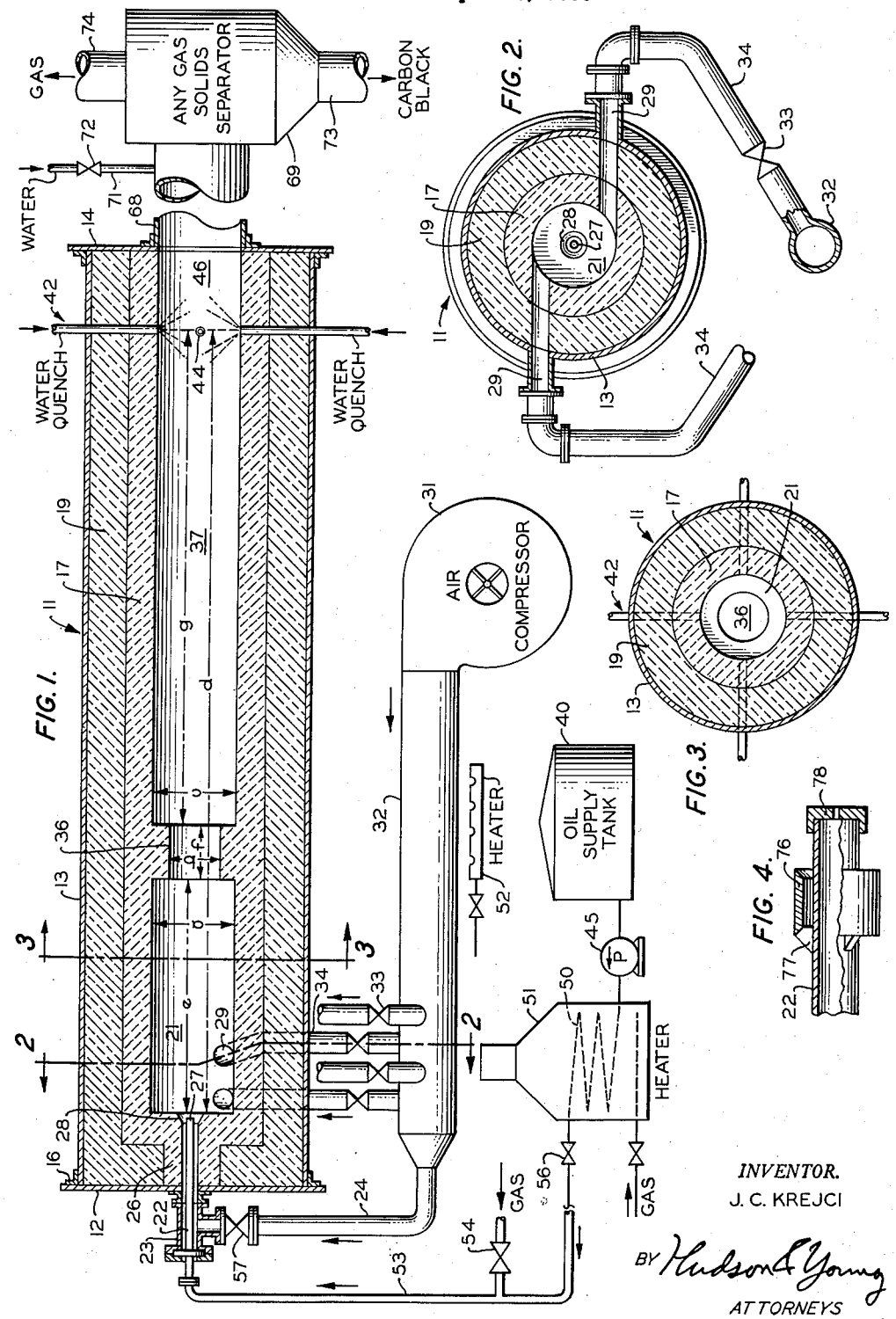
INVENTOR.
J. C. KREJCI
BY Hudson & Young
ATTORNEYS United States Patent Office 2,967,762
Patented Jan. 10, 1961

2,967,762
FURNACE CARBON BLACK PROCESS AND APPARATUS

Joseph C. Krejci, Phillips, Tex., assignor to Phillips Petroleum Company, a corporation of Delaware Filed Apr. 6, 1956, Ser. No. 576,630

4 Claims. (Cl. 23—209.6)

This invention relates to processes of manufacturing carbon black from hydrocarbons by partial combustion and/or pyrolysis in a carbon black furnace, and to carbon black furnaces useful in such processes. In one aspect it has relation to process of making carbon black in which the reactants are passed through a choke, and to furnaces containing such a choke. In another aspect it relates to the relative size, position, and geometry of position of such a choke to obtain increased structure in the carbon black, resulting in higher oil absorption by the carbon black, and in a decrease in the extrusion shrinkage and increases in the modulus, abrasion resistance, and smoothness of extrusion of rubber mixtures compounded with carbon black from such processes.

In the prior art of making carbon black by partial combustion and/or pyrolysis of hydrocarbon in the presence of heated gas or an oxidant, such as a free oxygen containing gas, such as air, with or without an auxiliary fuel, such as natural gas, with or without preheating said reactant and/or oxidant and/or fuel, it has long been the object of difficult research to improve the quality of the carbon black produced. As the chief use for carbon black is incorporating the same in rubber compounds to increase their stability, and the major portion of these rubber compounds are employed in automobile tires, the most important qualities to improve are to reduce the extrusion shrinkage, increase the modulus, the smoothness of extrusion, and the resistance of the final carbon black-containing rubber compound to abrasion. To achieve any increase in quality of carbon black at the present stage of the art has become extremely difficult because of the vast amount of prior research and commercial experience in this field, combined with the fact that a large number of variables are involved in the carbon black making process, the result of varying any one or more of which cannot be predicted, but can only be determined after extensive, expensive, and time-consuming tests involving completely rebuilding expensive furnaces, making carbon black in the same under various conditions of feed and air ratios, and then testing the several carbon blacks produced in time-consuming tests in rubber compounds.

The present invention consists in the unexpected discovery that by placing a choke of a critical size in a critical position in otherwise conventional carbon black furnaces that the abrason resistance of said carbon black in rubber compounds, is substantially increased.

One object of the present invention is to provide an improved process of making carbon black in the furnace by partial combustion and/or pyrolytic conversion of hydrocarbon.

Another object is to provide a new and useful furnace for carrying out said improved carbon black producing process.

Numerous other objects and advantages will be apparent to those skilled in the art upon reading the accompanying specification, claims and drawings.

In the drawings:

Figure 1 is a cross-sectional elevational view of a carbon black furnace embodying the present invention.

Figure 2 is a cross-sectional view of the apparatus shown in Figure 1 taken along the line 2—2 of Figure 1 looking in the direction indicated.

Figure 3 is a cross-sectional view of the apparatus of Figure 1 taken along the line 3—3 of Figure 1 looking in the direction indicated.

Figure 4 is an elevational cross-sectional view of a hydrocarbon spray nozzle which can be substituted for the central pipe shown in Figure 1, and a guide for the same which could be used on said pipe in Figure 1 if desired.

In Figure 1 a carbon black furnace generally designated as 11 comprises a refractory-lined heat-insulated body having generally cylindrical bore. As long as the body is a refractory and heat-insulated, it is of little concern how it is constructed as to details, but in order to teach how to best practice the invention the furnace 11 will now be described in some detail as to the presently preferred construction of the same, it being realized that the invention can be practiced in furnaces of other construction. It is presently preferred to construct the furnace with an outer metal sheath, or cover, comprising several metal pipe and/or plate sections such as 12, 13 and 14 of convenient size secured together in any conventional manner, such as by flanges 16 which may be welded, or bolted (not shown) together. Centrally positioned in said sheath is a refractory tube generally designated as 17 preferably made up of blocks, or pipes, of any suitable ceramic material capable of withstanding the temperatures ranging up to about 2000 to about 4000° F. which may exist in various portions of the furnace. While the entire furnace could be made of the same ceramic material as blocks 17, this would be more expensive than necessary, as considerable money is saved by filling the space between ceramic tube 17 and metal sheath 13 with a suitable castable heat-insulating material 19.

As sheath 13 can be common carbon steel refractory blocks 17 can be any one of a number of ceramic refractories available on the market such as "Crystalite" (trademark), and heat-insulating material 19 can be any one of a number of heat insulating cements or mortars available on the market such as "Kaocast" or "Alfrax" (trademarks), commonly used in constructing carbon black furnaces, no further description of these materials is necessary.

In the furnace embodying the present invention the heat-insulated body is provided with a generally cylindrical bore, said bore comprising in series a generally cylindrical first chamber 21 having a diameter ($a$) less than its length ($e$). Chamber 21 is provided with means to introduce hydrocarbon feed generally axially thereof comprising a centrally located axially disposed pipe 22. The furnace could be constructed with pipe 22 coming in through the end wall (not shown) and the process of producing the carbon black, the yield of carbon black, and the quality of carbon black produced would remain substantially the same, but difficulty might be experienced due to overheating and burning of the end of tube 22 and/or the deposition of carbonaceous material thereon due to premature cracking of hydrocarbon therein, to such an extent that the furnace eventually would have to be shut down to clean, repair, or replace tube 22. Therefore, it is preferred to mount tube 22 in an annular pipe T 23 through which a relatively minor amount of inert gas, or air is supplied through pipe 24 to form a cooling and insulating annular sheath around the end of pipe 22. When air is employed at 24 the oxygen present therein tends to remove carbonaceous material from the exterior of pipe 22, but the chief function is believed to be that of cooling the end of pipe 22, as a less reactive gas, such as hydrogen, carbon dioxide, carbon monoxide, methane, or mixtures thereof will tend to prevent such deposits.

In order to provide an annular space for this minor amount of air a ceramic tube 26 is provided, and while not critical to the carbon black process, the period of time during which the furnace is trouble-free is improved by recessing the end 27 of pipe 22 a minor distance inside an outwardly tapered portion 28 of the tube 26. The present invention is not limited thereto, as it has been found possible to extend the end 27 of tube 22 out into chamber 21 without having any effect on the carbon black process or product of a deleterious nature, except that tube 22 has a shorter life.

Also, present in the first chamber 21 are means to introduce free oxygen-containing gases thereinto generally tangentially to the inner surface thereof, commonly called tangential air tubes 29, which are best seen in Figure 2. Metal or refractory tubes may be employed, as the entering air (even if preheated) tends to cool the same enough to enable the use of metal, if desired.

In Figure 2, which is a cross-sectional view looking upstream of the furnace, air tubes 29 are formed and positioned in the body of furnace 11, and disposed and positioned to discharge gases generally tangentially to the inner surface of first chamber 21.

Air, or other free oxygen-containing gas, is supplied by blower 31, or other pressure source, through header manifold 32, valves 33 and lines 34 to air tubes 29. The heat for pyrolysis of the axial hydrocarbon is supplied by burning the outer portion of the same with air 34 in first chamber 21.

Returning to Figure 1, said first chamber 21 is connected to discharge through a second choke chamber 36 into a third generally cylindrical chamber 37 the length ($g$) of which is greater than its diameter ($c$), and the diameter ($c$) of which is susbtantially that of said first chamber ($a$). It will be noted that said first chamber 21, said second choke chamber 36, and said third chamber 37 are axially aligned and communicating with each other.

In order to stop the carbon black forming reaction at its optimum point and prevent further reactions of a degenerative nature it is preferred to quench the effluent smoke passing through third chamber 37 at a preselected point by suitable quench means, such as water spray quench means generally designated as 42. Any quench means of the prior art may be employed, the one shown having a water spray supply pipe which discharges the spray through nozzle 44 into third chamber 37 thereby terminating chamber 37 as a reaction chamber at that point so that the conduit 46 dwnstream of quench 42 is merely a discharge conduit, and water spray 44 is in effect at the downstream end of said third chamber 37.

However, it is not essential in the practice of the invention to employ a water spray, or other quench, as it has been found by suitably proportioning the furnace 11 and downstream conduit 46 that valuable grades of carbon black may be produced without quenching the same, but merely by cooling slowly by indirect heat exchange with the atmosphere through the walls of the discharge conduit.

In the practice of the present invention useful results are obtained employing as the axially introduced hydrocarbon in pipe 22 any hydrocarbon gas, such as methane, natural gas, ethane, propane, butane, or mixtures of the same, from valve 54, or any normally liquid hydrocarbon being forced through pipe 22 into chamber 21 in the form of spray, or superheated vapor. But the best results are obtained when the hydrocarbon feed in pipe 22 is at least 80% vapor at 775° F. of an aromatic-containing normally liquid gas oil of about 12 or 13 API gravity with an ASTM 90% boiling point of about 775° F. (about 90% evaporated at 775° F.) and a Bureau of Mines correlation index of about 80–95 from tank 40, pump 45 and furnace coil 50. In combination with this axial feed, useful results are obtained by employing as the tangential oxidant entering through pipe 34, air, oxygen enriched air, or air tempered with less reactive gas such as combustion gases, but the best results are obtained by injecting ordinary air through pipe 34.

As shown in Figure 1, furnace, or reactor, 11 is connected into a carbon black producing system permitting the various feeds to be modified as described above, and permitting the preheating of all, or any portion, of the reactant in the preheat zone 51, and any portion of the oxidant in preheat zone 32. Preheat zones 51 and 32 may be any indirect heat exchange heaters, such as conventional tube heater, or they can be in heat exchange with outlet pipe 68 of reactor 11.

The hydrocarbon reactant introduced axially through pipe 22 is supplied through pipe 53, the amount being controlled by valves 54 and 56. The axial sheath of jacket air entering T 23 is supplied from a suitable source 24 in the amount desired, or can be eliminated by valve 57. The oxidant, generally air, is supplied to pipe 34 from source 31 under pressure.

Conduit 68 forms a downstream continuation of discharge conduit 46 and carries the carbon black-containing effluent smoke from furnace 11 to any conventional gas-solids separation zone 69, and obviously indirect cooling to the atmosphere occurs in conduits 46 and 68, which may be supplemented if desired, by further spray quenching a 71 in amounts controlled by valve 72. In separation zone 69 the flocculent carbon black 73 is separated from the off gas 74.

In Figure 4 p'pe 22 is shown supported by a spider 76 having radial spokes 77, which can also be done in Figure 1. When oil is to be sprayed in as a liquid mist or spray, a spray head 78 of any usual design may be attached to the end of pipe 22.

Whenever normally liquid hydrocarbon is employed as a liquid spray from pipe 22, the heat in first chamber 21 is such that the spray is vaporized immediately, so that the result is the introduction of a vaporous, or gaseous, hydrocarbon into the chamber 21, and the term "vaporous hydrocarbon" is intended therefore to cover both normal gases, such as methane, and vaporized gas oil, whether vaporized in a preheat zone, or sprayed into the chamber 21 and immediately flashed into gas. Furthermore, both preheat and spraying as a liquid with pressure drop through a nozzle 78 into chamber 21 will cause very quick formation of vaporous hydrocarbon. With or without preheating, the spraying of liquid hydrocarbon into chamber 21 results in introducing vaporous hydrocarbon into the first zone formed by chamber 21.

EXAMPLE

As shown by data below, the use of a choke 36 is very critical in the operation of the invention, and is considered essential. The exact dimensions of the choke 36 are critical and the best results are obtained when the interior of the choke has a diameter ($b$) from ½ to ¾ the diameter ($a$) of first chamber 21 and a length ($f$) of ½ to twice its diameter ($b$).

It is preferred to have square shoulders and a cylindrical choke 36 rather than other shaped chokes, but some valuable results can be obtained with a Venturi shaped choke (not shown).

It is essential, however, that the sum of the length ($e$) of the first chamber 21 and the length ($f$) of the second chamber 36 be less than the length ($g$) of the third chamber, or half the length ($d$) of all three chambers, and the length ($e$) of the first chamber 21 be from 2 to 4 times, and preferably from 2.5 to 3.5 times the diameter ($a$) of the first chamber 21.

The furnace dimensions should be as in Table I.

Table 1
SUITABLE FURNACE DIMENSIONS

| Dimension Involved | Preferred Run #4, Table II | Limits Lower | Limits Upper |
|---|---|---|---|
| | Inches | | |
| Diameter a | 15 | 4" | 36" |
| Diameter b | 9 | a/2 | 3a/4 |
| Diameter c | 15 | 0.8a | 1.2a |
| Length d | 144 | 5a | 15a |
| Length e | 42 | 2a | 4a |
| Length f | 9 | b/2 | 2b |

It is essential that $e+f<d/2$, that $b/2<f<2b$, and $a/2<b<3a/4$ and it is preferred that $e$ is from $2.5a$ to $3.5a$.

The following data has been selected as being average and truly representative of the improved results obtained by the use of the choke of the present invention, compared to the results obtained in an otherwise identical furnace not having any choke. All the furnaces of runs 1 to 5 of Table II had dimensions and equipment corresponding to those given in Table I and shown in Figure 1, which is drawn approximately to scale, except for choke position. In the control furnace of run 1 of Table II there was no choke, and the third chamber continued cylindrically upstream until it merged with the first chamber. In the furnaces of run 4 of Table II of the present invention a choke was employed as shown in Figure 1 approximately to scale, and as given in the third column of Table I. In runs 2, 3 and 5 of Table II the same size choke was moved in chamber 21 to the position shown in the second column of Table II.

In all the furnaces, the same type of at least 80% vaporized normally liquid hydrocarbon oil in the amounts shown in Table II was injected axially into the furnace through the axial central pipe 22 in the upstream end of the first chamber, surrounded by a sheath of a minor amount of axial air. This axial air is not necessary, and has little effect if any on the process, but is employed to insure that carbon will not deposit at the inlet, especially on the central hydrocarbon pipe, and that said pipe will not overheat. Tangential air was supplied through the four tangential inlets 29 in the amounts shown in Table II, and burned in the furnaces. The carbon black produced in all the furnaces was separated by the same conventional separation means and tested in the same conventional tests after being compounded in the same amounts in the same rubber stock, all in the same manner.

In Table II "M s.c.f./hr." means thousand standard cubic feet per hour, "Gals./hr." means U.S. gallons per hour. "300% modulus" is the stress, in pounds per square inch of cross-sectional area, on a rubber specimen at 300 percent elongation. "Extrusion shrinkage, percent" is the decrease in length of an extruded rubber specimen which results from swelling of the rubber as it leaves the die; in other words $$\text{Extrusion Shrinkage, percent} = \frac{(x - \text{actual length})\,100}{x}$$

where $x$ is the length if no swelling took place (extruded specimen is same diameter as die). "Abrasion index" is a standard test of the abrasion resistance of standard rubber samples each containing respectively a standard amount of the carbon black of runs Nos. 2 to 5 compared to the same tests of the same type standard rubber sample containing a like amount of the carbon black from run No. 1, wherein the furnace had no choke. "Oil absorption" is the cubic centimeters of oil that 1 gram of carbon black will absorb in a standard test.

The standard rubber mixture was that known as 122 F GR-S tread formula, of 100 parts synthetic rubber GR-S-X720 (a butadiene styrene condensation polymer), 50 parts carbon black of the respective run, 3 parts zinc oxide, 6 parts "BRT#7," 1.75 parts sulfur, and 0.8 part "Santocure," all well known to those skilled in the art. Standard compounding procedure and a cure time of 30 minutes was employed.

"BRT#7" is a refined coal tar product, 1.2 to 1.25 specific gravity, of Engler specific viscosity at 100° C. of 6 to 9 used as a plasticizer. "Santocure" is N-cyclohexyl-2-benzothiazlsulfenamide.

The results of these comparative runs are shown in Table II below:

Table II
IN A 15-INCH DIAMETER FURNACE

| Run No. | Length of 1st Chamber in Inches | Axial oil rate, gal./hr. | Tangential air rate, M s.c.f./hr | Yield, lb./gal. | Oil Absorption, cc./g. | Properties of rubber containing the carbon black of this run | | |
|---|---|---|---|---|---|---|---|---|
| | | | | | | 300% Modulus, p.s.i. | Extrusion Shrinkage, Percent | Abrasion Index |
| 1 | no choke | 140 | 47.5 | 4.49 | 1.38 | 1,570 | 56.8 | 100 |
| 2 | 18 | 51 | 14.5 | 4.77 | 1.56 | 1,480 | 57.2 | 94 |
| 3 | 30 | 100 | 33.7 | 4.46 | 1.60 | 1,740 | 54.6 | 109 |
| 4 | 42 | 140 | 51.8 | 4.27 | 1.68 | 1,870 | 54 | 125 |
| 5 | 54 | 160 | 60.6 | 4.21 | 1.60 | 1,810 | 54.4 | 118 |

It will be noted that in run No. 4, with the choke 42 inches from the inlet end of the furnace, that the oil absorption, modulus, extrusion shrinkage, and abrasion index reached the best values of any run.

While certain processes, specific apparatus, and specific examples have been given for illustrative purposes, the invention obviously is not limited thereto.

Having described my invention, I claim:

1. A process for producing carbon black comprising introducing a vaporous hydrocarbon into an inlet end of a first generally cylindrical zone along the axis thereof, establishing a mass of hot combustion gases surrounding said vaporous hydrocarbon in said first zone by continuously injecting tangentially thereinto a free oxygen containing gas; continuously passing said vaporous hydrocarbon surrounded by said hot combustion gases from said first zone through a second choke zone axially into a third generally cylindrical zone of substantially the same diameter as said first zone, said choke zone being spaced from 2.5 to 3.5 times the diameter of said first zone from the inlet end of the furnace, but with the sum of the lengths of the first and second zones being less than half the sum of the lengths of all three zones, the interior of said coke zone being from ½ to ¾ the diameter of said first zone, and the length of said choke zone being from ½ its diameter to twice its diameter, said first and third zones being in communication through said choke zone and in substantial axial alignment therewith, forming carbon black from said vaporous hydrocarbon by pyro-chemical action due to the heat of the surrounding hot combustion gases without the further addition of any substantial amount of air, removing the resulting carbon black and gases from the end of said third zone, and separating the carbon black from the resulting gaseous products of said process.

2. The process of claim 1 in which the hot combustion gases are quenched below the temperature of further reaction by a water spray immediately upon reaching the end of the third zone.

3. A carbon black furnace comprising in combination a refractory heat insulated body having three generally cylindrical chambers axially aligned and connected in series with each other, the diameter of the first and third chambers being substantially the same, and the intermediate second chamber having a diameter from ½ to ¾ the diameter of the first chamber, the length of the first chamber being from 2.5 to 3.5 times its diameter, the length of the second chamber being from ½ to twice its diameter, and the sum of the lengths of the first and second chambers being less than half the sum of the lengths of all three chambers, hydrocarbon injection means disposed to inject hydrocarbons generally axially into said first chamber, free oxygen containing gas injecting means disposed to inject gas generally tangentially of the inner surface into said first chamber, the walls of said second and third chambers being uninterrupted by any further gas inlet means, and said third chamber terminating at the end opposite said second chamber in an unrestricted outlet.

4. The apparatus of claim 3 in which water spray injection means is disposed within said third chamber adjacent said outlet of said third chamber to spray water into said third chamber generally normal to the central axis thereof, to quench and terminate the carbon black reaction therein.

References Cited in the file of this patent
UNITED STATES PATENTS

| | | |
|---|---|---|
| 2,368,827 | Hanson et al. | Feb. 6, 1945 |
| 2,368,828 | Hanson et al. | Feb. 6, 1945 |
| 2,375,795 | Krejci | May 15, 1945 |
| 2,605,174 | Krejci | July 29, 1952 |
| 2,626,466 | Williams | Jan. 13, 1953 |